Patented Apr. 29, 1941

2,239,832

UNITED STATES PATENT OFFICE 2,239,832

INSECTICIDE

Lloyd E. Smith, Washington, D. C., assignor to Henry A. Wallace, Secretary of Agriculture of the United States of America, and his successors in office No Drawing. Application February 10, 1939, Serial No. 255,701

3 Claims. (Cl. 167—30)

(Granted under the act of March 3, 1883, as amended April 30, 1928; 370 O. G. 757)

This application is made under the act approved March 3, 1883, as amended by the act of April 30, 1928, and the invention herein described, if patented, may be manufactured and used by or for the Government for governmental purposes without the payment to me of any royalty thereon.

My invention relates to the improvement in materials for destroying or checking the growth or multiplication of living organisms, whether plant or animal, which are economically injurious to man.

An object of this invention is to provide a material for use as an insecticide.

Another object of this invention is to provide a material which is relatively non-toxic to man and warm blooded animals when taken by mouth and which can be used in the place of lead arsenate and other arsenicals commonly used for destroying insects without leaving a harmful residue on fruits and vegetables.

I have found that the three isomeric aminoacetanilides are effective in killing many species of insects whether applied externally or internally; that these organic compounds may be sprayed or dusted upon delicate foliage without injuring it; that these compounds are as effective as lead arsenate and other commonly used insecticides and that they are relatively non-toxic to warm blooded animals.

These compounds may be reduced to impalpable powder by grinding and applied to vegetation either dry as a dust or wet as a spray. The products being soluble in oils may be applied as a component of an oil emulsion spray. When applied as a spray in water it may be desirable to incorporate an effective wetting agent, such as one of the so-called sulfonated oils. For certain purposes the addition of a suitable adhesive or "sticker" may be advisable. These products may also be applied by dissolving them in an appropriate solvent such as acetone and pouring the resulting solution into water whereupon a fine colloidal precipitate is formed. This may be applied directly to the host plant or may be combined with a suitable wetting agent or adhesive and then sprayed. As examples of the toxicity of these compounds the following results were obtained using p-aminoacetanilide as an insecticide:

1. When tested as a dust against the 6th instar of the Southern army worm at a concentration of 310 micrograms per square centimeter, the kill was 90% with but slight feeding. When used as a spray at a concentration of 2 pounds per 100 gallons of water, the compound gave 80% kill of the 5th instar of this same insect.

2. When tested as a dust against the 4th instar of the melon worm at a concentration of 230 micrograms per square centimeter, the compound gave 100% kill of this insect.

3. When used as a spray against the 4th instar of the bean leaf roller at a concentration of 8 pounds per 100 gallons of water, 100% of the insects were killed.

4. At a dosage of 8 pounds per 100 gallons of water the compound gave a 95% kill of the 5th instar of the cabbage looper.

5. One hundred percent of the 4th instar of the cross-striped cabbage worm was killed using the compound as a spray at a dosage of 8 pounds per 100 gallons of water.

6. The compound also killed 70% of the 5th instar of the imported cabbage worm when used at a concentration of 8 pounds to 100 gallons of water.

7. p-Aminoacetanilide at a concentration of 8 pounds per 100 gallons of water was tested against potato, egg plant, tomato, pepper and bean foliage with no injury noted 10 days after the application of the spray.

It is to be understood that the results given above, in which p-aminoacetanilide was used, do not restrict this invention to said compound.

Having thus described my invention, I claim:

1. An insecticide containing as its essential active ingredient p-aminoacetanilide.

2. An insecticide containing as its essential active ingredient m-aminoacetanilide.

3. An insecticide containing as its essential active ingredient o-aminoacetanilide.

LLOYD E. SMITH.